C. C. & L. E. GLEASON.
ANIMAL GUN.
APPLICATION FILED DEC. 6, 1915.
1,233,268.
Patented July 10, 1917.
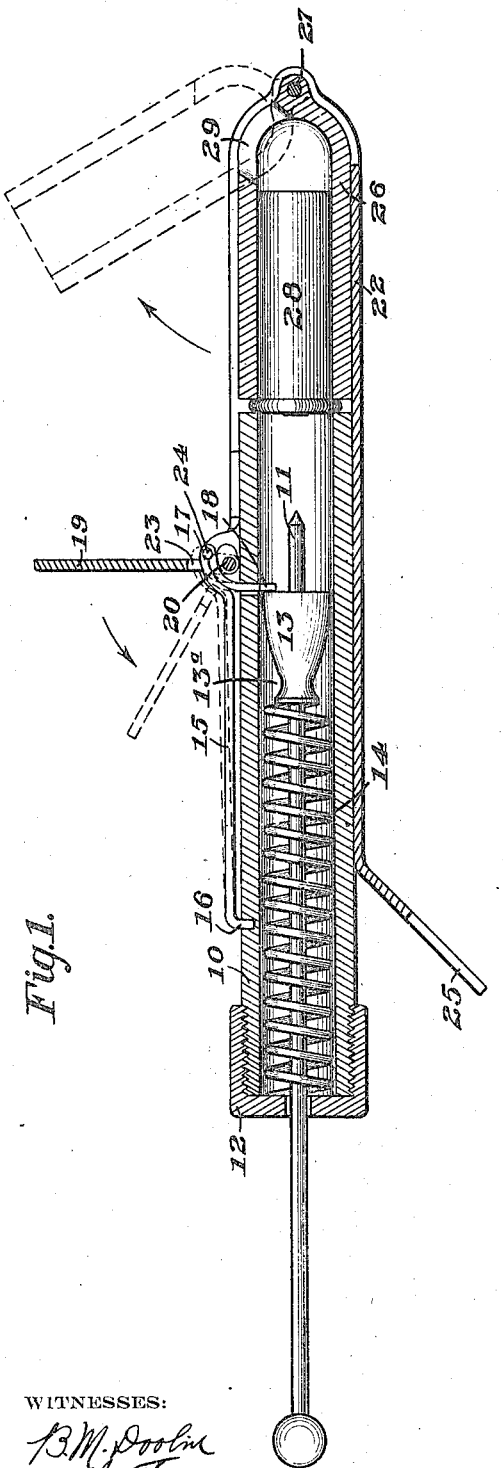
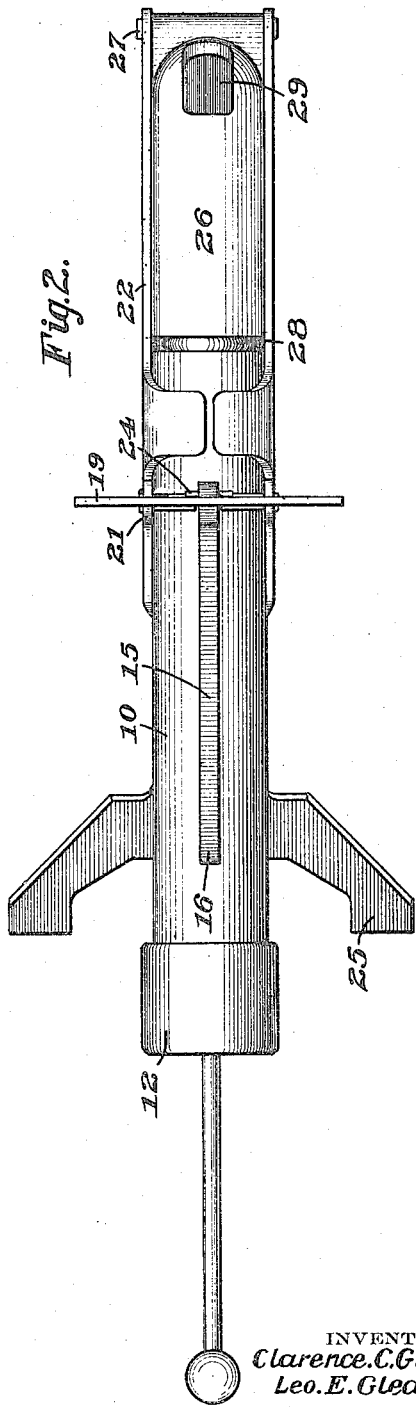
WITNESSES:
B. M. Doolin
L. J. Forde
INVENTORS
Clarence. C. Gleason.
Leo. E. Gleason.
BY Strong & Townsend
ATTORNEYS

UNITED STATES PATENT OFFICE.

CLARENCE C. GLEASON AND LEO E. GLEASON, OF SANTA CRUZ, CALIFORNIA.

ANIMAL-GUN.

1,233,268.  Specification of Letters Patent. Patented July 10, 1917.

Application filed December 6, 1915. Serial No. 65,243.

*To all whom it may concern:*

Be it known that we, CLARENCE C. GLEASON and LEO E. GLEASON, citizens of the United States, residing at Santa Cruz, in the county of Santa Cruz and State of California, have invented new and useful Improvements in Animal-Guns, of which the following is a specification.

This invention relates to animal guns; and has for its object to simplify and improve the construction and operation of such devices.

In carrying out this object we employ an improved cylinder provided with a spring-pressed firing pin, and having an improved trigger arrangement for releasing said pin when an obstruction, such as a burrowing animal, meets the same, and an improved form of barrel hinged upon the cylinder and adapted to receive a cartridge.

One form which our invention may assume is exemplified in the following description and illustrated in the accompanying drawing, in which—

Figure 1 shows a vertical, longitudinal, central, sectional view of a device embodying our invention.

Fig. 2 shows a plan view of the same.

Referring in detail to the drawing, the device there shown is made up of a cylinder 10, carrying a firing pin 11 movable longitudinally in the cylinder and having a projecting rear end extending through a small opening formed in a screw cap 12 fitted on said cylinder. A collar or enlarged portion 13 is formed upon said pin, near its forward end, and a compression spring 14, carried by the pin, resides between said collar and the screw cap 12 so that when the pin is drawn rearwardly, by means of the projecting rear end, the spring is put under tension.

For retaining the firing pin in its rearward position, we employ a trigger 15, constructed of spring wire and laid partially upon the top of the cylinder, being held thereon by means of a bent end 16 embedded in the cylinder and having an upwardly and forwardly curved corner portion 17 and a downwardly extending end portion 18 passing through an opening in the wall of the cylinder and terminating in a position to engage the forward end of the collar 13 on the pin.

For controlling the trigger 15 we employ a trip plate 19 constructed of a widened flat portion normally projecting upwardly from the cylinder and pivoted, at its lower end, upon pintles 20 carried in brackets 21 formed integrally upon a jacket 22 covering the cylinder. The trip plate 19 is cut away at its lower end to form a recess 23 for the reception of the curved corner portion 17 of the trigger, and when the said trip plate is moved to vertical or upstanding position it acts to move the trigger downwardly on account of the curved corner portion 17 being shaped in the manner of a cam. A lug 24 is formed upon the end of the corner portion 17 to limit the forward movement of the trip plate. The parts are so arranged that the said trip plate, when moved rearwardly to substantially horizontal position, disengages the curved corner portion 17 of the trigger and allows the latter to move upwardly under its own tension.

The jacket 22, inclosing the cylinder 10, has, at its rear end, outstanding leg portions 25 provided for the purpose of engaging the ground to retain the gun in position against rearward movement when the same is discharged. The forward end of the jacket 22 projects a considerable distance beyond the forward end of the cylinder 10 and is made substantially channel-shaped in cross section to receive a barrel 26 in alinement with the cylinder 10. The barrel 26 is pivoted or hinged at its forward end to the jacket 22 by means of a pin 27 and can be swung upwardly to the position shown in dotted lines in Fig. 1 for the purpose of receiving a blank cartridge 28 when loading the gun. The barrel 26 is rounded at its forward end and has a discharge opening 29 arranged at the forward upper corner of said end so that the explosion caused by the discharge of the cartridge 28 passes through said opening. A 38 caliber blank cartridge may be used, the explosion from which directed toward the animal, instantly kills the animal. Gopher guns of this sort employing blank cartridges have been in practical use for some time.

In the operation of the device just described, the barrel is loaded with a blank cartridge in the manner already indicated and the firing pin, which normally is projected forwardly a slight distance into the rear end of the barrel 26, is readily cocked by drawing the same rearwardly to put the spring 14 under compression, whereupon movement of the trip plate 19 from horizontal to vertical position will set the trigger 15 to retain the pin in this position.

The device is then placed under ground in the path of a burrowing animal and the discharge takes place when the animal has, by moving the loose earth in front of him, tripped the plate 19. Ordinarily this tripping will take place some time before the animal has reached the gun, on account of the movement of the loose earth in front, so that it becomes advantageous to have the discharge or explosion from the blank cartridge take place in a forward and upward direction in order that the animal will be within the range of the gun when the trigger is tripped.

Preferably, we construct the collar 13 with an intermediate attenuated portion 13ᵃ to permit the end 18 of the trigger to move thereagainst when the gun is in inoperative position and thus to relieve the tension on the spring wire of which the trigger is made. It will be noted that we have succeeded in producing a gun having a minimum of projecting parts and so inclosed throughout as to prevent its clogging when buried in loose earth.

Another important advantage of our device is the hinged arrangement of the barrel whereby the discharged cartridge can be easily removed and the barrel reloaded in a minimum of time.

Changes and modifications in the construction and arrangement of the several parts of our device may, obviously be employed without departing from the spirit of our invention as disclosed in the appended claims.

Having thus described our invention, what we claim and desire to secure by Letters Patent is—

1. In an animal gun for use in the ground, the combination of a cylinder, a spring-actuated firing pin therein, a spring retracted trigger projecting through the cylinder to engage the firing pin, and an upstanding trip plate pivoted on the cylinder for holding the said trigger in engaged position with the firing pin, said trip plate being adapted to be actuated by a burrowing animal to release the trigger.

2. In an animal gun, the combination of a cylinder, a spring-actuated firing pin carried therein, a spring wire trigger on the cylinder having an angular extension passing through an opening in the wall thereof to engage the firing pin and provided with a curved upwardly and forwardly projecting corner, and an upstanding trip link pivoted on said cylinder and working against the curved corner portion of the trigger to retain the latter in engaged position with the firing pin.

3. In an animal gun, the combination of a cylinder, a firing pin carried thereby, a barrel to receive a cartridge, a jacket carried on said cylinder and having a channel-shaped forward extension embracing the barrel, and a hinged connection between the forward end of the barrel and said channel-shaped extension.

In testimony whereof we have hereunto set our hands in the presence of two subscribing witnesses.

CLARENCE C. GLEASON.
LEO E. GLEASON.

Witnesses:
FRANCIS EDWARD MORGAN, Jr.,
HAZEL M. COLLINS.

Copies of this patent may be obtained for five cents each, by addressing the "Commissioner of Patents, Washington, D. C."